(12) United States Patent
Bhogal et al.

(10) Patent No.: US 10,656,921 B2
(45) Date of Patent: May 19, 2020

(54) SPARSE OBJECT INSTANTIATION

(71) Applicant: International Business Machines Corporation, Armonk, NY (US)

(72) Inventors: Kulvir S. Bhogal, Fort Worth, TX (US); Nitin Gaur, Round Rock, TX (US); Christopher D. Johnson, Rochester, MN (US); Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/633,669

(22) Filed: Jun. 26, 2017

(65) Prior Publication Data

US 2017/0308362 A1    Oct. 26, 2017

Related U.S. Application Data

(63) Continuation of application No. 14/620,550, filed on Feb. 12, 2015, now Pat. No. 9,720,659.

(51) Int. Cl.
*G06F 8/36* (2018.01)
*G06F 8/20* (2018.01)
*G06F 9/448* (2018.01)

(52) U.S. Cl.
CPC .............. *G06F 8/36* (2013.01); *G06F 8/24* (2013.01); *G06F 9/449* (2018.02)

(58) Field of Classification Search
CPC ..................................... G06F 8/24; G06F 8/36
See application file for complete search history.

(56) References Cited

U.S. PATENT DOCUMENTS 6,308,182 B1 * 10/2001  Nishigaya ................. G06F 9/52
6,332,218 B1 * 12/2001  Walker ..................... G06F 9/445
                                                         713/2
6,427,230 B1    7/2002  Goiffon et al.
(Continued)

OTHER PUBLICATIONS

Peng Hao-Lin, et al., Research on memory Leakage in Java Application, In Proceedings of 3rd IEEE International Conference on Computer Science and Information Technology, Jul. 2010, pp. 146-148, vol. 2, IEEE, Chengdu, P. R. China.
(Continued)

*Primary Examiner* — Jae U Jeon
*Assistant Examiner* — Douglas M Slachta
(74) *Attorney, Agent, or Firm* — Aaron N. Pontikos

(57) ABSTRACT

A code reuse user interface executed by a processor allows a code developer to specify unused data variables of a coded object definition to be reused, from pre-existing code within a new application, as a partial object without instantiation of the unused data variables. An indication from the code developer that at least one data variable of the reused coded object definition is specified as unused in the new application is detected within the code reuse user interface. The specified at least one unused data variable of the reused coded object definition is externalized from the code reuse user interface to a runtime environment, where as part of execution of the new application in the runtime environment, the runtime environment instantiates the reused coded object definition as the partial object without instantiation of the specified at least one unused data variable.

18 Claims, 5 Drawing Sheets

(56) References Cited

U.S. PATENT DOCUMENTS

| | | | |
|---|---|---|---|
| 6,976,243 B2 | 12/2005 | Charisius et al. | |
| 7,082,597 B2 | 7/2006 | Sokolov et al. | |
| 7,293,254 B2 * | 11/2007 | Bloesch | G06F 9/4488 717/108 |
| 7,707,544 B2 * | 4/2010 | Beust | G06F 8/30 717/106 |
| 7,971,010 B2 | 6/2011 | Schmelter et al. | |
| 8,464,227 B2 * | 6/2013 | Clinton | G06F 8/51 717/136 |
| 8,539,452 B2 | 9/2013 | Chapman et al. | |
| 8,578,329 B1 * | 11/2013 | Chiluvuri | G06F 8/36 717/106 |
| 9,317,259 B2 * | 4/2016 | Chandrasekharan | G06F 8/36 |
| 9,952,837 B1 * | 4/2018 | Maclay | G06F 8/35 |
| 2004/0225995 A1 | 11/2004 | Marvin et al. | |
| 2004/0268323 A1 * | 12/2004 | Tanaka | G06F 9/4488 717/136 |
| 2005/0005258 A1 * | 1/2005 | Bhogal | G06F 8/73 717/102 |
| 2006/0048114 A1 | 3/2006 | Schmidt | |
| 2006/0136497 A1 | 6/2006 | Gikas et al. | |
| 2007/0022405 A1 * | 1/2007 | Bray | G06F 8/24 717/106 |
| 2007/0234278 A1 | 10/2007 | Damm et al. | |
| 2007/0261036 A1 | 11/2007 | Drake et al. | |
| 2008/0104096 A1 | 5/2008 | Doval et al. | |
| 2008/0148229 A1 | 6/2008 | Gownder et al. | |
| 2009/0037875 A1 | 2/2009 | Jones et al. | |
| 2009/0064099 A1 * | 3/2009 | Foley | G06F 8/433 717/110 |
| 2009/0064106 A1 * | 3/2009 | Webster | G06F 8/36 717/120 |
| 2009/0138847 A1 | 5/2009 | Beckwith et al. | |
| 2010/0083219 A1 * | 4/2010 | Tavares | G06F 9/4488 717/107 |
| 2010/0107135 A1 * | 4/2010 | Arsanjani | G06Q 10/067 717/104 |
| 2010/0293542 A1 | 11/2010 | Lagergren et al. | |
| 2012/0110482 A1 * | 5/2012 | Zhang | G06F 8/38 715/762 |
| 2012/0233591 A1 * | 9/2012 | Thyagarajan | G06F 8/61 717/107 |
| 2012/0233593 A1 * | 9/2012 | Sahoo | G06F 8/61 717/120 |
| 2012/0233597 A1 * | 9/2012 | Ogasawara | G06F 8/36 717/124 |
| 2012/0246204 A1 | 9/2012 | Nalla et al. | |
| 2012/0254835 A1 * | 10/2012 | Muddu | G06F 8/75 717/121 |
| 2012/0266159 A1 | 10/2012 | Risbood et al. | |
| 2014/0047413 A1 * | 2/2014 | Sheive | H04L 65/403 717/110 |
| 2014/0100676 A1 * | 4/2014 | Scott | G06F 3/0484 700/83 |
| 2014/0129182 A1 | 5/2014 | Weatherhead et al. | |
| 2014/0337816 A1 * | 11/2014 | Chiluvuri | G06F 8/36 717/107 |
| 2015/0169321 A1 | 6/2015 | Rissell et al. | |
| 2016/0041815 A1 * | 2/2016 | Bhagat | G06F 8/36 717/107 |
| 2016/0239273 A1 | 8/2016 | Bhogal et al. | |

OTHER PUBLICATIONS

Fausto Spoto, et al., Inference of Field Initialization, In Proceedings of 33rd International Conference on Software Engineering, May 2011, pp. 231-240, Association for Computing Machinery, Honolulu, HI, USA.

Author Unknown, IBM Redbooks: Introduction to the SmartLinker, 2004 (Printed from website on Feb. 6, 2015), pp. 1-10, IBM Corporation, Published online at: http://www.redbooks.ibm.com/redbooks/SG247082/ch7.htm.

IBM, List of IBM Patents or Patent Applications Treated as Related, Applicant Appendix, Jun. 26, 2017, pp. 1-2, the contents of which are incorporated herein by reference in their entirety.

United States Patent and Trademark Office, Office Action for U.S. Appl. No. 14/620,550, dated May 5, 2016, pp. 1-27, Alexandria, VA, USA.

United States Patent and Trademark Office, Office Action for U.S. Appl. No. 14/620,550, dated Nov. 2, 2016, pp. 1-27, Alexandria, VA, USA.

United States Patent and Trademark Office, Notice of Allowance for U.S. Appl. No. 14/620,550, dated Mar. 22, 2017, pp. 1-20, Alexandria, VA, USA.

* cited by examiner

SPARSE OBJECT INSTANTIATION

BACKGROUND

The present invention relates to code reuse. More particularly, the present invention relates to sparse object instantiation.

Object-oriented technologies allow definition of an application object's data and/or coded methods using a class structure. The class structure is used to instantiate an object of the type of the class during runtime, and the instantiated object includes all of the data variables and/or coded methods defined in the class structure.

SUMMARY

A method includes: allowing, within a code reuse user interface executed by a processor, a code developer to specify unused data variables of a coded object definition to be reused, from pre-existing code within a new application, as a partial object without instantiation of the unused data variables; detecting within the code reuse user interface an indication from the code developer that at least one data variable of the reused coded object definition is specified as unused in the new application; and externalizing, from the code reuse user interface to a runtime environment, the specified at least one unused data variable of the reused coded object definition, where as part of execution of the new application in the runtime environment, the runtime environment instantiates the reused coded object definition as the partial object without instantiation of the specified at least one unused data variable.

A system that performs the method and a computer program product that causes a computer to perform the method are also described

DETAILED DESCRIPTION

Figure 1:
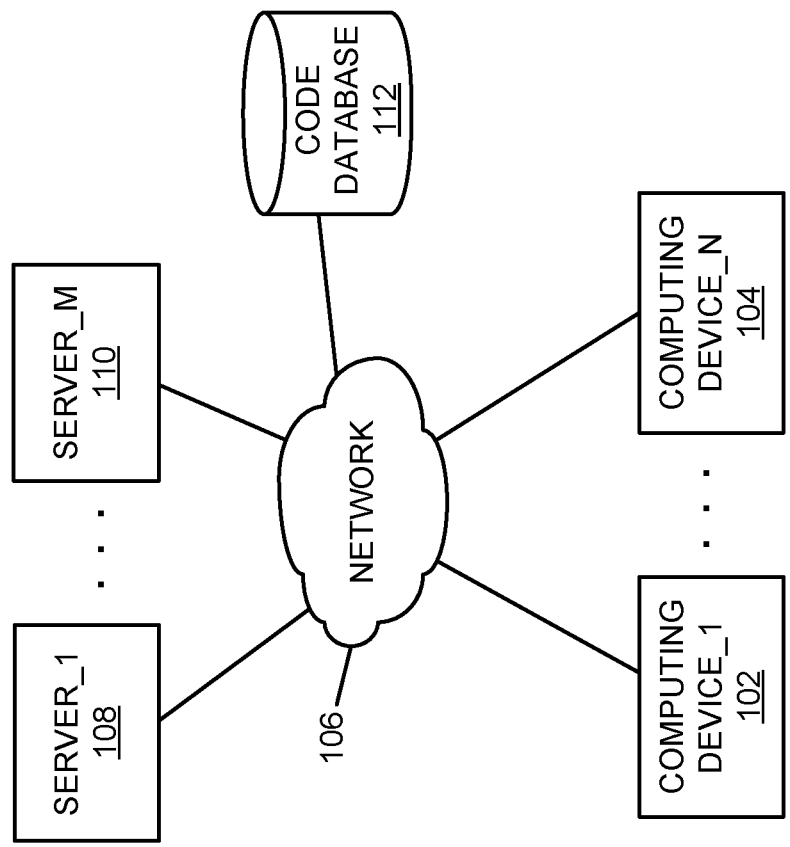
FIG. 1 is a block diagram of an example of an implementation of a system for sparse object instantiation according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides sparse object instantiation. The present technology solves a recognized code reuse problem by providing technology that includes a new form of object instantiation using a computing device that reduces memory footprints of objects defined within reused code to improve memory use and computational processing within complex computing environments. A code developer is allowed to designate/annotate individual data variables of a reused coded object definition (e.g., a class definition) that will not be used by the application under development that is reusing the code. These designated data variables are externalized to a runtime environment. In turn, a processing module within the runtime environment, such as a Java™ virtual machine (JVM®), may be modified to recognize and respect these developer designations, and to only create a partial in-memory instantiated object, termed alternatively a "sparse" object herein. As such, the present technology provides a design-time and runtime integration of functionality, where a sparse object's properties are not instantiated or initialized based upon a developer instruction not to instantiate one or more particular attributes/data variables.

This instantiated sparse/partial object may take up less space within the memory of the runtime environment because attributes are never created as part of the object's instantiation, which will provide a reduced in-memory footprint from the time of instantiation. The instantiated sparse object may further take up less storage space when serialized from memory, and as such, may take up less bandwidth when passed across a network. In this manner, the present technology alters object creation during object instantiation to improve multiple runtime aspects related to the instantiated "sparse" objects, and offers a new design paradigm for code reuse. An application developer that is reusing code may use/reuse objects without having to use the objects in their entirety to obtain improved code reuse, smaller memory footprints, and improved runtime efficiency with reduced object transmission bandwidth. Additionally, new code does not need to be developed to utilize the benefits of smaller instantiated objects.

Using the present technology, a developer may use an integrated development environment (IDE) that depicts a representation of an object, such as by representation of a class definition of an object. The developer may graphically mark or tag variables (e.g., data attributes) of an object that they do not intend to use. The tagged variables may be identified as sparse object annotations and stored in a partial object instantiation properties file as instructions to a runtime environment that instantiates the object to inform the runtime environment not to instantiate the tagged variables. In turn, when a runtime environment instantiates the object, the runtime environment may check the properties file and determine if there are any instructions/annotations regarding how to sparsely instantiate the object to be instantiated in a partial form (e.g., minus the unused variables). If a sparse instantiation is specified, the runtime environment may sparsely instantiate the object by not instantiating any attributes/data variables tagged with a sparse object annotation. Otherwise, the runtime environment may instantiate the entire object. It should be noted that the present technology may be implemented with existing code in view of the separation of the variable tagging from the code itself and the compilation of the code. The IDE may further evaluate a code build and warn the application developer whether the variables that they have marked as unused are in fact being referenced by methods that are being called by the code under development (either the code the developer has created or the code that other developers have created).

The terms "sparse object instantiation," "partial object instantiation," and similar terms used herein are considered synonyms and are defined as instantiation of objects without instantiation of memory space for any specified unused attributes/data elements defined within a class definition from which the respective objects are instantiated. As such, the sparse/partial instantiation described herein creates "abridged" objects with certain variables missing at the time of instantiation from the sparsely/partially instantiated in-memory object. It should be noted that because the present technology for partial object instantiation operates within a runtime environment during object instantiation by not creating memory elements, the present technology does not incur additional memory consumption for initial instantiation of objects or subsequent run-time processor consumption for reduction of in-memory elements. As such, the present technology provides efficient runtime instantiation of objects with memory footprints that may be much smaller when instantiated. The present technology also provides efficient runtime reuse of code by avoiding post-instantiation processing of instantiated objects.

It should be noted that conception of the present subject matter resulted from recognition of certain limitations associated with code reuse. For example, it was observed that in-memory instantiation of objects of reused existing code (e.g., Java™ programming language object instantiation in a Java™ virtual machine (JVM®)) often results in instantiation of large portions of objects that are not used by new consuming applications that are coded to reuse the existing code. It was further recognized that these objects still reside in memory and that they are not being used in their entirety. It was determined that this inefficient memory consumption of reused object instantiations may lead to performance issues, such as frequent garbage collection or out-of-memory (OOM) conditions. The present subject matter improves code reuse by providing technology for identification of unused attributes/data elements within class definitions and instantiation of objects from the classes without the unused attributes/data elements. The present technology provides a reduction in the instantiation size of objects where data elements of a reused object are not needed in a new code development, as described above and in more detail below. As such, improved memory utilization and memory processing during code reuse may be obtained through use of the present technology.

The sparse object instantiation described herein may be performed in real time to allow prompt instantiation of reduced-sized objects. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for sparse object instantiation. A computing device_1 102 through a computing device_N 104 communicate via a network 106 with several other devices. The other devices include a server_1 108 through a server_M 110, and a code database 112.

As will be described in more detail below in association with FIG. 2 through FIG. 5, the computing device_1 102 through the computing device_N 104 and/or the server_1 108 through the server_M 110 may each provide automated sparse object instantiation. The automated sparse object instantiation is based upon code developer identification of data variables of pre-existing code that are not used in a new application that is under development. The automated sparse object instantiation operates to instantiate "partial" objects without instantiation of any specified unused data variables. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The code database 112 may include a relational database, an object database, or any other storage type of device. As such, the code database 112 may be implemented as appropriate for a given implementation. The code database 112 may store pre-existing code that may be reused. The code database 112 may also store new applications, and may store new partial object annotations (e.g., partial object properties files) associated with coded object definitions that are reused within the new applications as partial objects without instantiation of all data variables of the coded object definitions.

Figure 2:
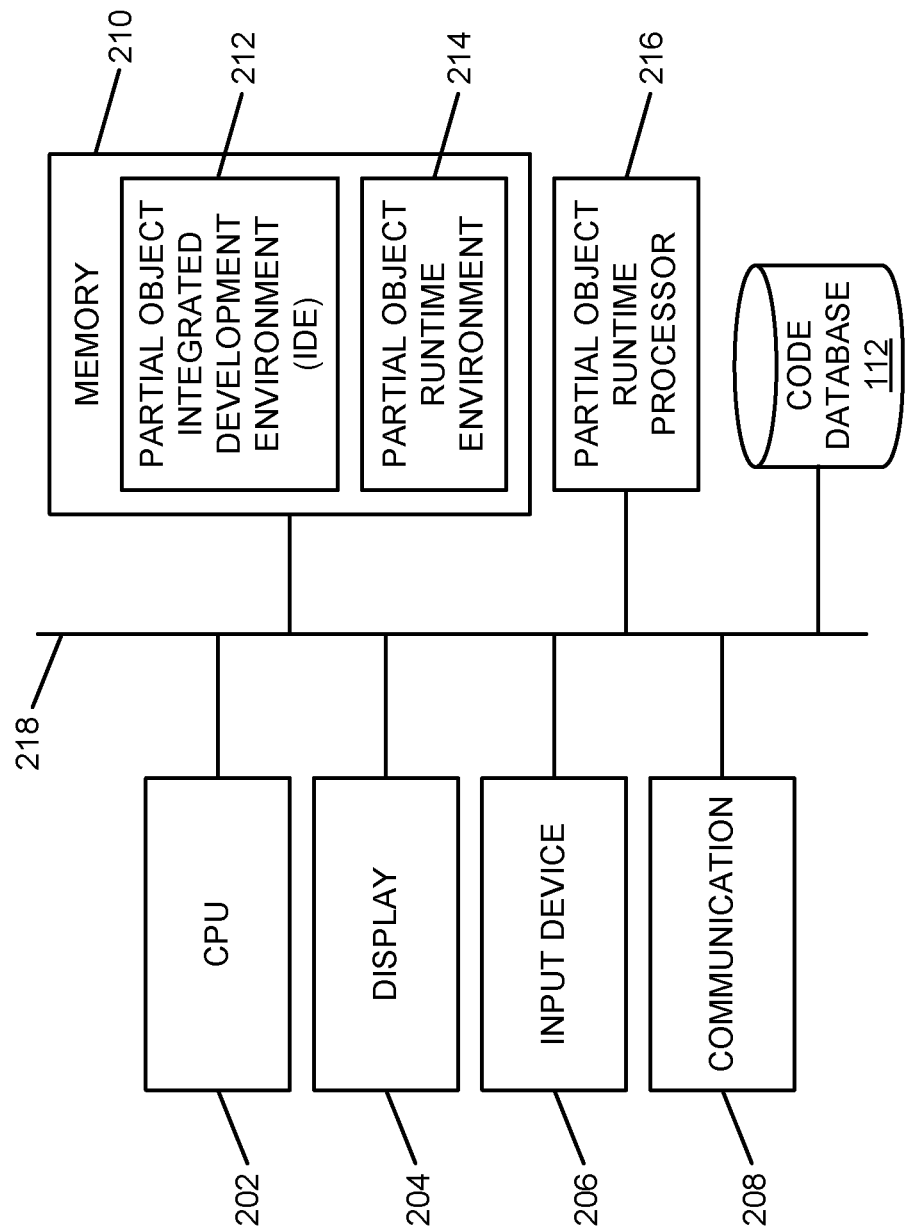
FIG. 2 is a block diagram of an example of an implementation of a core processing module capable of performing sparse object instantiation according to an embodiment of the present subject matter.

FIG. 2 is a block diagram of an example of an implementation of a core processing module 200 capable of performing sparse object instantiation. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of sparse object instantiation in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a partial object integrated development environment (IDE) area 212 that stores and executes a partial object IDE in association with the core processing module 200. As will be described in more detail below, the partial object IDE is a code reuse user interface that allows a code developer to specify unused data variables of a coded object definition to be reused, from pre-existing code within a new application, as a partial object without instantiation of the unused data variables. The partial object IDE may display coded object definitions (e.g., class definitions), and the code developer may mark data variables that are unused within code that is to be reused in a new application. The marked (unused) data variables may be stored as partial object annotations within a partial object properties file that identifies the specified unused data variables of the coded object definition. The partial object properties file may be stored locally in the memory 210, may be stored in the code database 112, or may be stored elsewhere as appropriate for a given implementation. A separate partial object properties file may be specified for each coded object definition to provide granular specification of partial objects, or partial object annotations may be combined into a common file that is partitioned for the application or partitioned in accordance with functional or other aspects of the new application, again as appropriate for a given implementation.

The memory 210 also includes a partial object runtime environment area 214. The partial object runtime environment area 214 may execute a new application and may execute the new application with instantiated partial objects (e.g., objects instantiated without all specified variables). The new application may be executed by a modified partial-object Java™ virtual machine (JVM®) that instantiates partial objects in accordance with partial object annotations associated with coded method definitions. The modified partial-object JVM® may also execute within the partial object runtime environment area 214, or may execute elsewhere within the memory 210 and manage the partial object runtime environment area 214.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A partial object runtime processor 216 is also illustrated. The partial object runtime processor 216 provides partial object instantiation for the core processing module 200, as described above and in more detail below. The partial object runtime processor 216 implements the automated sparse object instantiation of the core processing module 200. The partial object runtime processor 216 represents a modified partial-object Java™ virtual machine (JVM®) that searches, as part of runtime instantiation of the coded object definition in association with runtime execution of the new application in the runtime environment, for code developer-specified unused data variables of the coded object definition (e.g., a partial object properties file). The partial object runtime processor 216 may identify, in accordance with the coded object definition, partial object annotations created by the code developer that each specify one unused data variable of the coded object definition that is being reused in the new application. The partial object runtime processor 216 may further instantiate, in accordance with any identified partial object annotation, a partial in-memory object with only the data variables of the respective coded object definition other than any specified unused data variables.

It should also be noted that the partial object runtime processor 216 may form a portion of other circuitry described without departure from the scope of the present subject matter. Further, the partial object runtime processor 216 may alternatively be implemented as an application stored within the memory 210. In such an implementation, the partial object runtime processor 216 may include instructions executed by the CPU 202 for performing the functionality described herein. The CPU 202 may execute these instructions to provide the processing capabilities described above and in more detail below for the core processing module 200. The partial object runtime processor 216 may form a portion of an interrupt service routine (ISR), a portion of an operating system, a portion of a browser application, or a portion of a separate application without departure from the scope of the present subject matter.

The code database 112 is again shown within FIG. 2 associated with the core processing module 200. As such, the code database 112 may be operatively coupled to the core processing module 200 without use of network connectivity, as appropriate for a given implementation.

The CPU 202, the display 204, the input device 206, the communication module 208, the memory 210, the partial object runtime processor 216, and the code database 112 are interconnected via an interconnection 218. The interconnection 218 may include a system bus, a network, or any other interconnection capable of providing the respective components with suitable interconnection for the respective purpose.

Though the different modules and processors illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the code database 112 is illustrated as a separate component for purposes of example, the information stored within the code database 112 may also/alternatively be stored within the memory 210 without departure from the scope of the present subject matter. Accordingly, the core processing module 200 may take many forms and may be associated with many platforms.

Figure 3:
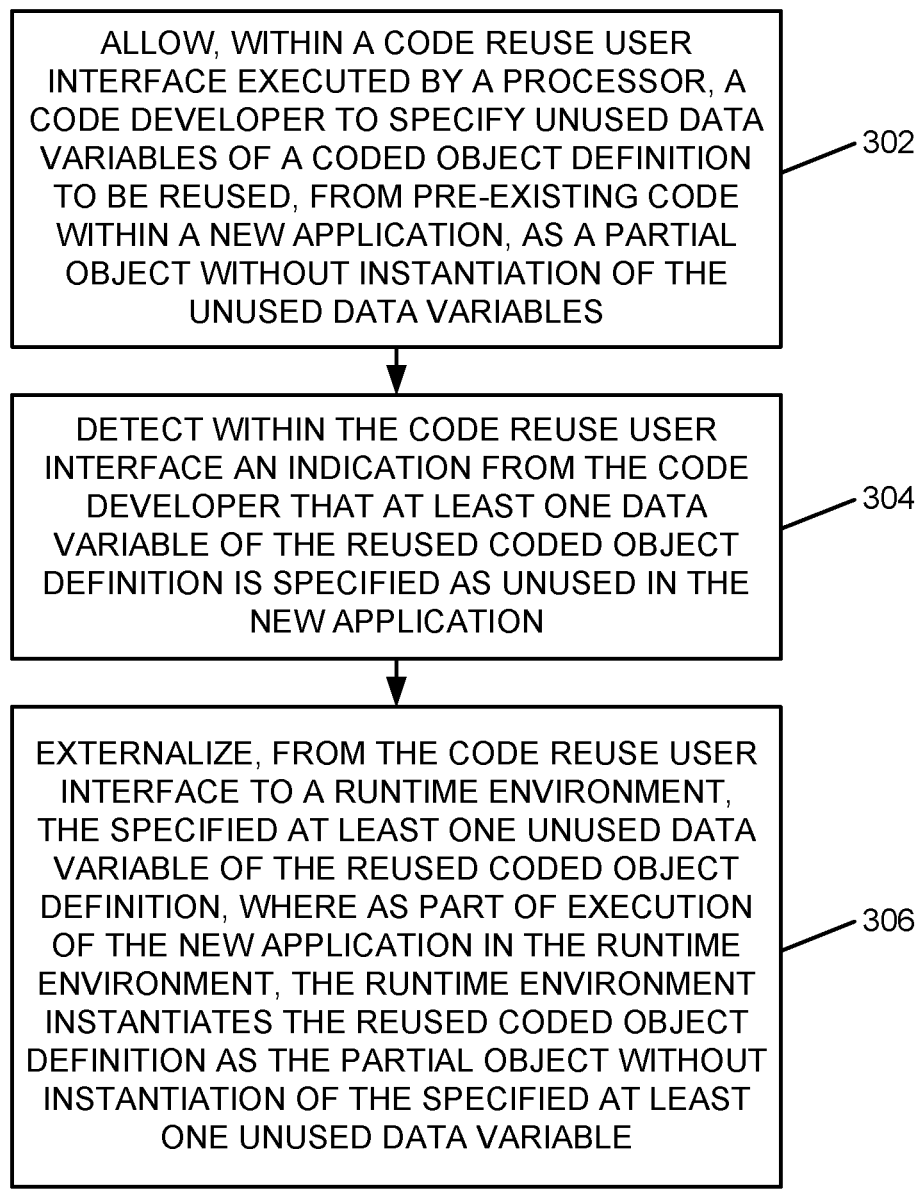
FIG. 3 is a flow chart of an example of an implementation of a process for sparse object instantiation according to an embodiment of the present subject matter.
Figure 4:
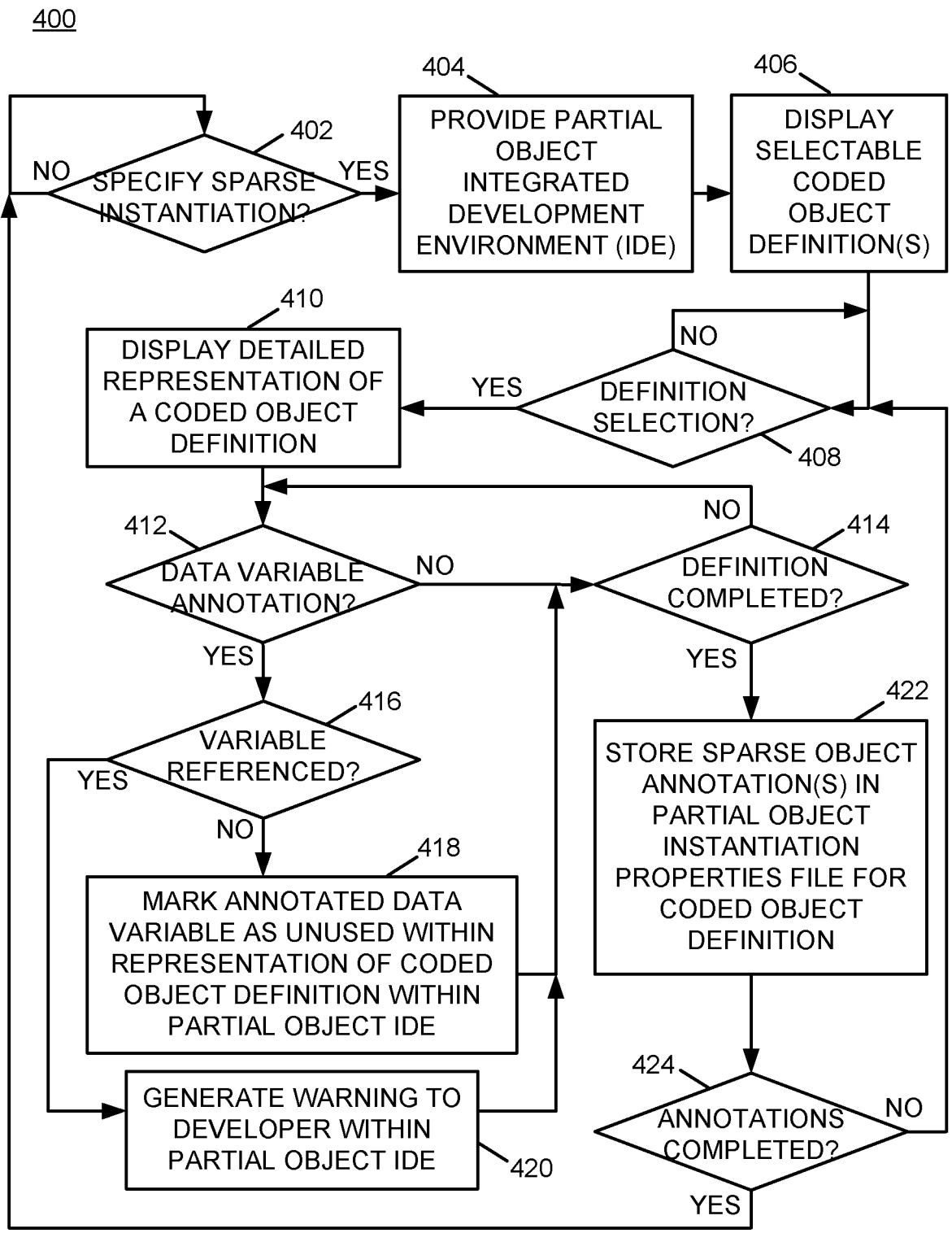
FIG. 4 is a flow chart of an example of an implementation of a process for sparse object instantiation design phase processing according to an embodiment of the present subject matter.
Figure 5:
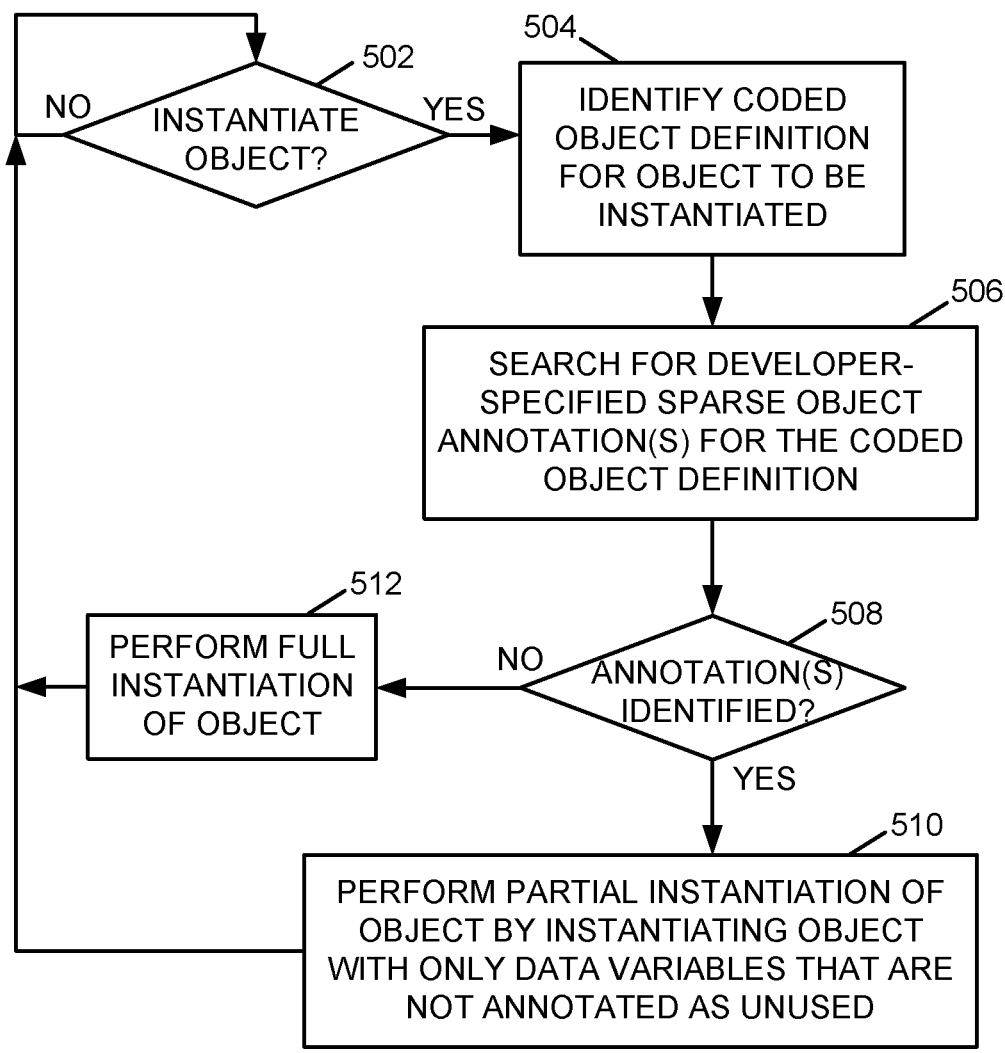
FIG. 5 is a flow chart of an example of an implementation of a process for sparse object instantiation within a runtime environment according to an embodiment of the present subject matter.

FIG. 3 through FIG. 5 described below represent example processes that may be executed by devices, such as the core processing module 200, to perform the automated sparse object instantiation associated with the present subject matter. Many other variations on the example processes are possible and all are considered within the scope of the present subject matter. The example processes may be performed by processors, such as the partial object runtime processor 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for sparse object instantiation. The process 300 represents a computer-implemented method of performing the sparse object instantiation described herein. At block 302, the process 300 allows, within a code reuse user interface executed by a processor, a code developer to specify unused data variables of a coded object definition to be reused, from pre-existing code within a new application, as a partial object without instantiation of the unused data variables. At block 304, the process 300 detects within the code reuse user interface an indication from the code developer that at least one data variable of the reused coded object definition is specified as unused in the new application. At block 306, the process 300 externalizes, from the code reuse user interface to a runtime environment, the specified at least one unused data variable of the reused coded object definition, where as part of execution of the new application in the runtime environment, the runtime environment instantiates the reused coded object definition as the partial object without instantiation of the specified at least one unused data variable.

FIG. 4 is a flow chart of an example of an implementation of a process 400 for sparse object instantiation design phase processing. The process 400 represents a computer-implemented method of performing design aspects to allow code developers to identify unused data variables for instantiation of partial objects in association with the sparse object instantiation described herein. The process 400 may be performed in association with a partial object integrated development environment (IDE) that allows the code developer to specify unused data variables of the coded object definition to be reused from the pre-existing code within the new application as the partial object.

At decision point 402, the process 400 makes a determination as to whether a request to specify a sparse instantiation for one or more reused coded object definitions from pre-existing code has been detected. The request to specify a sparse instantiation may be detected, for example, in association with a startup or during execution of the partial object IDE, or otherwise as appropriate for a given implementation. In response to determining that a request to specify a sparse instantiation for one or more reused coded object definitions from pre-existing code has been detected, the process 400 provides the partial object IDE at block 404. At block 406, the process 400 displays one or more selectable coded object definitions. The selectable coded object definitions may be representations of reusable coded object definitions, such as class definitions or other representations as appropriate for the given implementation.

At decision point 408, the process 400 makes a determination as to whether an object definition selection has been detected. In response to determining that an object definition selection has been detected, the process 400 displays a detailed representation of the coded object definition at block 410. For example, a selectable class definition may be expanded to display all variables defined within the respective class definition.

At decision point 412, the process 400 begins iterative processing to allow the code developer to specify one or more data variables of the displayed detailed representation of the coded object definition as unused in the new application that is being designed to reuse the coded object definition. At decision point 412, the process 400 makes a determination as to whether a data variable annotation has been detected. A data variable annotation may include a code developer marking the respective data variable representation within the partial object IDE to indicate that the respective data variable of the reused coded object definition is unused in the new application, and that the data object definition should be instantiated as a partial object without instantiation of the unused data variable. Affirmative processing related to decision point 412 will be deferred and described in more detail below.

As such, in response to determining at decision point 412 that a data variable annotation has not been detected, the process 400 makes a determination at decision point 414 as to whether code developer processing of the displayed coded object definition is completed. Again, affirmative processing related to decision point 414 will be deferred and described in more detail below. In response to determining at decision point 414 that code developer processing of the displayed coded object definition is not completed, the process 400 returns to decision point 412 and iterates as described above.

Returning to the description of decision point 412, in response to determining that a data variable annotation has been detected, the process 400 makes a determination at decision point 416 as to whether the annotated data variable is actually used by any code associated with the new application, including code under development by the code developer or any other code developer that is developing code for the new application. As such, the process 400 may verify, in response to detecting the indication from the code developer that the data variable of the reused coded object definition is unused in the new application, that the specified data variable is not referenced by any coded method associated with the new application. In response to determining at decision point 416 that the annotated data variable is not used by any code associated with the new application, the process 400 marks the annotated data variable as unused within the displayed representation of the coded object definition within the partial object IDE at block 418. Alternatively, in response to determining at decision point 416 that the annotated data variable is actually used by any code associated with the new application, the process 400 generates a warning to the developer within the partial object IDE at block 420.

In response to either marking the annotated data variable as unused within the displayed representation of the coded object definition within the partial object IDE at block 418, or in response to generating the warning to the developer within the partial object IDE at block 420, the process 400 returns to decision point 414 to determine whether code developer processing of the displayed coded object definition is completed. The processing described above may iterate until the code developer is completed with the annotation of unused data variables for the respective coded object definition (e.g., class).

Returning to the description of decision point 414, in response to determining that the code developer processing of the displayed coded object definition is completed, the process 400 stores the sparse (partial) object annotations that have been marked and confirmed as unused within the code build within a partial object instantiation properties file for the coded object definition that identifies the specified unused data variable(s) of the coded object definition at block 422. The storage of the partial object annotations within the partial object instantiation properties file externalizes the annotations of the unused data variable(s) from the code reuse interface/IDE to a runtime environment for use by a virtual machine or other processing module that operates to instantiate objects within the runtime environment in association with execution the new application, as described in more detail below with reference to FIG. 5. As described in more detail below, the virtual machine may perform a partial instantiation of the respective coded object definition in accordance with the partial object annotation within a partial object instantiation properties file by not instantiating any annotated unused variables when the respective object is partially instantiated. The partial object instantiation properties file may be specified granularly for each coded object definition, may be specified less granularly for a set of classes that form a functional component of the new application, or may be specified for the new application itself to represent unused variable annotations for the entire application, as appropriate for the given implementation.

In response to storing the partial object instantiation properties file at block 422 the process 400 makes a determination at decision point 424 as to whether code developer annotations for all selectable coded object definitions are completed, such as by prompting the code developer or otherwise as appropriate for the given implementation. In response to determining that the code developer annotations for all selectable coded object definitions are not completed, the process 400 returns to decision point 408 to allow the code developer to select additional coded object definitions, and iterates as described above. As such, the code developer may select additional coded object definitions to annotate with specified unused data variables for the new application, and additional partial object instantiation properties files may be created at block 422. Alternatively, additional annotations for additional coded object definitions may be merged or appended into a previously created partial object instantiation properties files at block 422 as appropriate for the given implementation. In response to determining at decision point 424 that the code developer annotations for all selectable coded object definitions are completed, the process 400 returns to decision point 402 and iterates as described above.

As such, the process 400 displays a partial object IDE to a code developer that allows the code developer to specify unused data variables of one or more coded object definitions to be reused, from pre-existing code within a new application, as a partial object without instantiation of the unused data variables. The process 400 iteratively allows the developer to annotate unused data variables for coded object definitions that are available for reuse. The process 400 scans/parses all code used by the new application to verify that the annotated unused data variables are not referenced by any code within the new application. The process 400 creates one or more partial object instantiation property files that specify the annotated/marked unused data variables of the coded object definitions to externalize the code developer specifications of unused data variables to a runtime environment processing module, such as a virtual machine, so that the runtime environment processing module may, as part of execution of the new application in the runtime environment, instantiate the reused coded object definition as a partial object without instantiation of the specified at least one unused data variable.

FIG. 5 is a flow chart of an example of an implementation of a process 500 for sparse object instantiation within a runtime environment. The process 500 represents a computer-implemented method of performing the instantiation of partial objects within a runtime environment in accordance with annotations of unused data variables of coded object definitions in association with the sparse object instantiation described herein. The process 500 is described on a per-object instantiation basis, though it is understood that the process 500 may iterate for each object to be instantiated in association with an application execution for which partial object instantiation is to be performed within the runtime environment.

At decision point 502, the process 500 makes a determination as to whether an indication to instantiate an object has been detected. In response to determining that an indication to instantiate an object has been detected, the process 500 identifies a coded object definition for the object that is to be instantiated within the runtime environment at block 504. At block 506, the process 500 searches for developer-specified sparse object annotation(s) for the coded object definition. For example, the process 500 may search for a partial object instantiation properties file for the coded object definition with code developer specified sparse object annotation(s) for the coded object definition to be instantiated, or may search for or retrieve a less granular partial instantiation properties file such as one specified for more than one coded object definition. The processing is performed as part of runtime instantiation of the coded object definition in association with runtime execution of the new application in the runtime environment.

At decision point 508, the process 500 makes a determination as to whether any partial object annotation(s) created by the code developer have been identified. As described above, each partial object annotation specifies an unused data variable of the coded object definition. In response to determining that at least one partial object annotation has been identified for the coded object definition, the process 500 instantiates a partial in-memory object instance with only the data variables of the reused coded object definition other than the specified unused data variable(s) in accordance with the identified developer-specified partial object annotation(s) at block 510. As described above, the partial instantiation of objects allows for smaller in-memory footprints for reused coded object definitions when instantiated, and allows for reduced bandwidth for serialization and transfer of the instantiated partial in-memory objects.

Alternatively, in response to determining at decision point 508 that at least one partial object annotation has not been specified for the coded object definition, the process 500 performs a full instantiation of the coded object definition at block 512. As such, the described partial object instantiation may coexist with full instantiation as appropriate for the given coded object definitions that are being reused. In response to either instantiating the partial in-memory object with only the data variables of the coded object definition other than the specified unused data variable(s) at block 510, or in response to performing the full instantiation of the coded object definition at block 512, the process 500 returns to decision point 502 and iterates as described above.

As such, the process 500 may operate as part of a modified virtual machine to identify code developer-specified annotations of unused data variables associated with coded object definitions that are to be instantiated within a runtime environment, and instantiates partial in-memory objects with reduced memory footprints for any annotated coded object definitions. In this manner, the process 500 may reduce memory consumption to enhance code reuse, and may improve operational processing and bandwidth for in-memory object serialization and transmission of in-memory objects.

As described above in association with FIG. 1 through FIG. 5, the example systems and processes provide sparse object instantiation. Many other variations and additional activities associated with sparse object instantiation are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   receiving, through a source code reuse user interface executed by a processor and from a code developer, an unused source code data element definition data set that includes information identifying a set of unused source code data element definition(s) that are respectively defined within a source code class definition;
   verifying that the set of unused source code data element definition(s) are not used by source code already implemented in a new application; and
   responsive to verification that the set of unused source code data element definition(s) are not used by the source code already implemented in the new application, externalizing, from the source code reuse user interface to a runtime environment, an instruction not to reuse or instantiate the set of unused source code data element definition(s) of the source code class definition within the new application.

2. The method of claim 1, where each of the set of unused source code data element definition(s) is selected from a group consisting of a data variable definition and a data attribute definition, and where the source code reuse user interface comprises a partial object integrated development environment (IDE), and further comprising:
   displaying, within the partial object IDE, a representation of source code data element definitions of the source code class definition; and
   detecting, within the partial object IDE, the code developer annotating the set of unused source code data element definition(s) of the source code class definition.

3. The method of claim 1, where:
   externalizing, from the source code reuse user interface to the runtime environment, the instruction not to reuse or instantiate the set of unused source code data element definition(s) of the source code class definition comprises storing a partial object annotation within a partial object instantiation properties file that identifies the set of unused source code data element definition(s) of the source code class definition; and the runtime environment instantiates the source code class definition as a partial object without the reuse or instantiation of the set of unused source code data element definition(s) during runtime in accordance with the partial object annotation within the partial object instantiation properties file.

4. The method of claim 1, further comprising:
generating a warning to the code developer in response to determining that any of the set of unused source code data element definition(s) is used by at least one coded method of the source code already implemented in the new application.

5. The method of claim 1, further comprising instantiating, by a virtual machine executing within the runtime environment, a partial object from the source code class definition, where the instantiation of the partial object is performed without the reuse or instantiation of the set of unused source code data element definition(s).

6. The method of claim 5, where instantiating, by the virtual machine executing within the runtime environment, the partial object from the source code class definition, where the instantiation of the partial object is performed without the reuse or instantiation of the set of unused source code data element definition(s) comprises:
identifying, within the source code class definition, at least one partial object annotation that each specifies one of the set of unused source code data element definition(s) of the source code class definition; and
instantiating, in accordance with the identified at least one partial object annotation, the partial object with only data elements defined in the source code class definition other than the set of unused source code data element definition(s).

7. A system, comprising:
a source code reuse user interface;
a memory; and
a processor programmed to:
receive, through the source code reuse user interface executed from the memory by the processor and from a code developer, an unused source code data element definition data set that includes information identifying a set of unused source code data element definition(s) that are respectively defined within a source code class definition;
verify that the set of unused source code data element definition(s) are not used by source code already implemented in a new application; and
responsive to verification that the set of unused source code data element definition(s) are not used by the source code already implemented in the new application, externalize, from the source code reuse user interface to a runtime environment, an instruction not to reuse or instantiate the set of unused source code data element definition(s) of the source code class definition within the new application.

8. The system of claim 7, where each of the set of unused source code data element definition(s) is selected from a group consisting of a data variable definition and a data attribute definition, and where the source code reuse user interface comprises a partial object integrated development environment (IDE), and where the processor is further programmed to:
display, within the partial object IDE, a representation of source code data element definitions of the source code class definition; and
detect, within the partial object IDE, the code developer annotating the set of unused source code data element definition(s) of the source code class definition.

9. The system of claim 7, where:
in being programmed to externalize, from the source code reuse user interface to the runtime environment, the instruction not to reuse or instantiate the set of unused source code data element definition(s) of the source code class definition, the processor is programmed to store, within the memory, a partial object annotation within a partial object instantiation properties file that identifies the set of unused source code data element definition(s) of the source code class definition; and
the runtime environment instantiates the source code class definition as a partial object without the reuse or instantiation of the set of unused source code data element definition(s) during runtime in accordance with the partial object annotation within the partial object instantiation properties file.

10. The system of claim 7, where the processor is further programmed to:
generate a warning to the code developer in response to determining that any of the set of unused source code data element definition(s) is used by at least one coded method of the source code already implemented in the new application.

11. The system of claim 7, where the processor is further programmed to instantiate, by a virtual machine executing within the runtime environment, a partial object from the source code class definition, where the instantiation of the partial object is performed without the reuse or instantiation of the set of unused source code data element definition(s).

12. The system of claim 11, where, in being programmed to instantiate, by the virtual machine executing within the runtime environment, the partial object from the source code class definition, where the instantiation of the partial object is performed without the reuse or instantiation of the set of unused source code data element definition(s), the processor is programmed to:
identify, within the source code class definition, at least one partial object annotation that each specifies one of the set of unused source code data element definition(s) of the source code class definition; and
instantiate, in accordance with the identified at least one partial object annotation, the partial object with only data elements defined in the source code class definition other than the set of unused source code data element definition(s).

13. A computer program product, comprising:
a computer readable storage medium having computer readable program code embodied therewith, where the computer readable storage medium is not a transitory signal per se and where the computer readable program code when executed on a computer causes the computer to:
receive, through a source code reuse user interface executed by the computer and from a code developer, an unused source code data element definition data set that includes information identifying a set of unused source code data element definition(s) that are respectively defined within a source code class definition;
verify that the set of unused source code data element definition(s) are not used by source code already implemented in a new application; and
responsive to verification that the set of unused source code data element definition(s) are not used by the source code already implemented in the new application, externalize, from the source code reuse user interface to a runtime environment, an instruction not to reuse or instantiate the set of unused source code data element definition(s) of the source code class definition within the new application.

14. The computer program product of claim 13, where each of the set of unused source code data element definition(s) is selected from a group consisting of a data variable definition and a data attribute definition, and where the source code reuse user interface comprises a partial object integrated development environment (IDE), and where the computer readable program code when executed on the computer further causes the computer to:
  display, within the partial object IDE, a representation of source code data element definitions of the source code class definition; and
  detect, within the partial object IDE, the code developer annotating the set of unused source code data element definition(s) of the source code class definition.

15. The computer program product of claim 13, where:
in causing the computer to externalize, from the source code reuse user interface to the runtime environment, the instruction not to reuse or instantiate the set of unused source code data element definition(s) of the source code class definition, the computer readable program code when executed on the computer causes the computer to store a partial object annotation within a partial object instantiation properties file that identifies the set of unused source code data element definition(s) of the source code class definition; and
the runtime environment instantiates the source code class definition as a partial object without the reuse or instantiation of the set of unused source code data element definition(s) during runtime in accordance with the partial object annotation within the partial object instantiation properties file.

16. The computer program product of claim 13, where the computer readable program code when executed on the computer further causes the computer to:
  generate a warning to the code developer in response to determining that any of the set of unused source code data element definition(s) is used by at least one coded method of the source code already implemented in the new application.

17. The computer program product of claim 13, where the computer readable program code when executed on the computer further causes the computer to instantiate, by a virtual machine executing within the runtime environment, a partial object from the source code class definition, where the instantiation of the partial object is performed without the reuse or instantiation of the set of unused source code data element definition(s).

18. The computer program product of claim 17, where, in causing the computer to instantiate, by the virtual machine executing within the runtime environment, the partial object from the source code class definition, where the instantiation of the partial object is performed without the reuse or instantiation of the set of unused source code data element definition(s), the computer readable program code when executed on the computer causes the computer to:
  identify, within the source code class definition, at least one partial object annotation that each specifies one of the set of unused source code data element definition(s) of the source code class definition; and
  instantiate, in accordance with the identified at least one partial object annotation, the partial object with only data elements defined in the source code class definition other than the set of unused source code data element definition(s).

* * * * *